United States Patent [19]

Yoshigai

[11] Patent Number: 4,674,353
[45] Date of Patent: Jun. 23, 1987

[54] BRAKE OPERATING DEVICE

[75] Inventor: Toshiharu Yoshigai, Higashi-Osaka, Japan

[73] Assignee: Yoshigai Kikai Kinzoku Kabushiki Kaisha, Osaka, Japan

[21] Appl. No.: 817,252

[22] Filed: Jan. 8, 1986

[30] Foreign Application Priority Data

Jun. 3, 1985 [JP] Japan .................. 60-121215

[51] Int. Cl.⁴ .......................... B62K 23/06; B62L 3/02
[52] U.S. Cl. .................................. 74/489; 74/501 R; 267/158
[58] Field of Search .................. 74/488, 489, 501 B; 267/158

[56] References Cited

U.S. PATENT DOCUMENTS

| 648,769 | 5/1900 | Meyer | 267/158 X |
| 3,997,030 | 12/1976 | Yoshigai | 188/24 |
| 4,023,653 | 5/1977 | Yoshigai | 198/24 |
| 4,526,057 | 7/1985 | Mochida et al. | 74/501 B |

FOREIGN PATENT DOCUMENTS

| 23007 | 11/1956 | Fed. Rep. of Germany | 74/489 |
| 1021664 | 12/1952 | France | 74/489 |
| 52-31623 | 8/1977 | Japan | |
| 53-6416 | 3/1978 | Japan | |
| 5356 | 3/1884 | United Kingdom | 74/489 |
| 20124 | 9/1914 | United Kingdom | 74/501 B |

Primary Examiner—Allan D. Herrmann
Attorney, Agent, or Firm—Sixbey, Friedman & Leedom

[57] ABSTRACT

An operating unit including a brake operating lever capable of being grasped is mounted to a handlebar or the like. The brake unit for applying a braking force to the members to be controlled such as the wheels or the like is connected by a Bowden cable. In addition to the brake returning spring provided on the side of the aforementioned brake unit, a side of the brake operating lever is equipped with a returning spring. One end of the returning spring is mounted to the housing, while another end thereof is held on the side of the brake operating lever thereby exerting a force in the direction in which the lever is to be returned after being grasped and released.

8 Claims, 8 Drawing Figures

BRAKE OPERATING DEVICE

FIELD OF THE INVENTION AND RELATED ART STATEMENT

The present invention relates to a brake operating device utilized for a bicycle and the like. More specifically, the present invention relates to a brake operating device having a brake operating means including a housing mounted to a handlebar or the like and a brake operating lever, capable of being grasped, which is mounted to the housing; a brake means for braking members to be controlled such as wheels and the like; a Bowden cable including an inner wire and an outer wire which connect the brake means and the brake operating means to each other so that the brake means may transmit a grasping force of the brake operating lever in a direction giving rise to a braking force against the bias of a brake returning spring.

In the conventional technology, including the technology disclosed in U.S. Pat. Nos. 3,997,030 and 4,023,653 (corresponding to Japanese Patent Publication Nos. 52-31623 and 53-6416), the force of a brake returning spring provided on the brake means is transmitted by way of the Bowden cable to return the brake operating lever to the original state.

According to such art, since the resiliency of the brake returning spring must overcome the resistance of the Bowden cable, and the backlash of each part or the like in returning the operating lever, a fairly large amount of spring force is required. Consequently, proportionally excessive operational force must be applied to the operational lever. The excessive force beyond the operational force required to apply a braking force to the wheels, may also cause a cutting of the lever, misalignment of a cable and a nipple, and/or other various malfunctions.

Furthermore, although the resiliency of the brake returning spring may be made relatively larger, the returning of the operational lever becomes improper, adversely affecting what is known in the art as "lever touch." Also, the larger the resiliency of the brake returning spring is made, the more difficult assembly and adjustment of the brake means becomes.

OBJECTS AND SUMMARY OF THE INVENTION

A first object of the present invention is to provide a brake operating device including a brake operating lever which ensures that, after a grasping force is applied to the brake operating lever to generate a braking force, the brake operating lever returns to its original position.

Another object of the present invention is to provide a brake operating device which prevents potential damage and dislocation of components and connections in the operating device.

Still another object of the present invention is to provide a brake operating device which has a simplified structure, enabling more convenient and inexpensive production, assembly and adjustment thereof.

A third object of the present invention is to provide a brake operating device which enables the operational force required to be applied at the brake operating lever to be reduced, facilitating a pleasant and light brake operation.

These and other objects of the present invention are achieved by providing a brake operating device which includes brake operating means including a housing mounted to a handlebar or the like and a brake operating lever, capable of being grasped, attached to the housing; a brake means including a brake returning spring for braking the members to be controlled such as wheels or the like; a Bowden cable including an inner wire and an outer wire which connect the brake means and the brake operating means so that the brake means may transmit the grasping force applied to the brake operating lever giving rise to a braking force against the brake returning spring; and a lever returning spring, one end of which is attached to the side of the housing and another end of which slidably engages the braking operating lever.

BRIEF DESCRIPTION OF THE DRAWINGS

FIG. 3 is a schematic view of the entirety of a second embodiment of the present invention.

DETAILED DESCRIPTION OF PREFERRED EMBODIMENTS

A description of the brake operating device according to the present invention is made in conjunction with the accompanying drawings as follows. In each drawing the common members are indicated correspondingly by common symbols.

Figure 1:
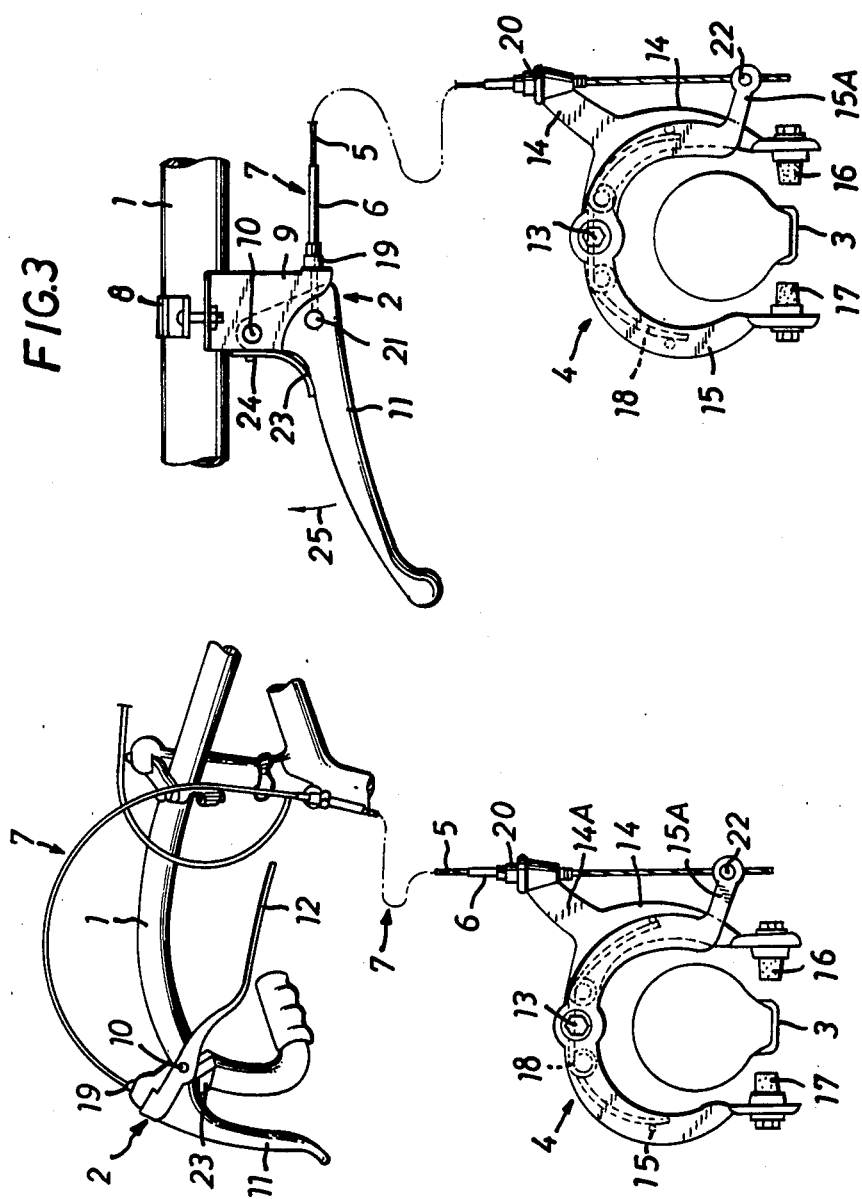
FIG. 1 is a schematic view of an embodiment of the present invention.
Figure 2:
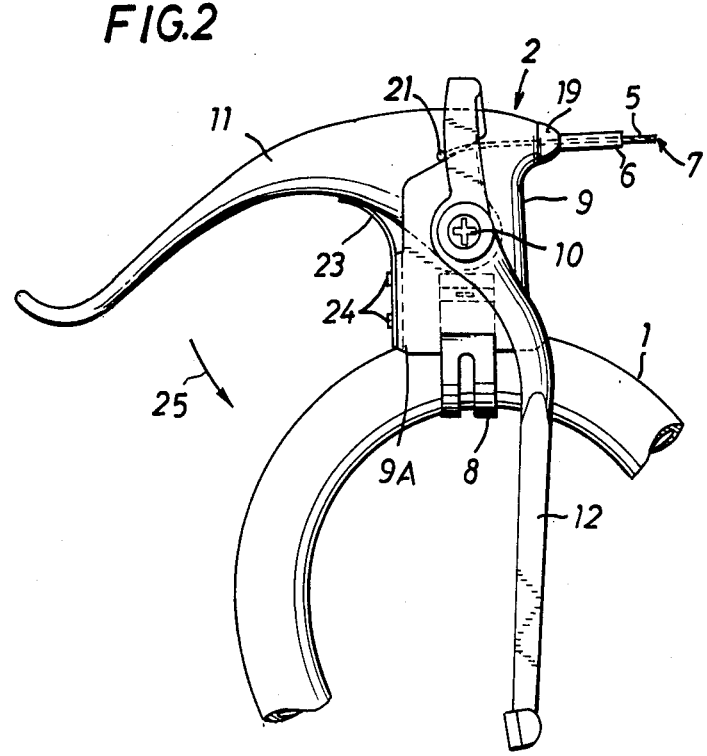
FIG. 2 is a side view of the brake operating means of the present invention.

FIGS. 1 and 2 show a drop type handlebar 1 equipped with the brake operating means 2, to which a side-pull type brake 4 is connected to apply a braking force to the members to be controlled 3 such as a front wheel or a rear wheel or the like. The operating means and brake are connected by a Bowden cable 7, including an inner wire 5 and an outer wire 6.

The brake operating means 2 includes the box type housing 9 mounted by a band fitting 8 to the handlebar 1 and an operating lever 11, capable of being grasped, which is mounted at a fulcrum shaft 10 to the aforementioned housing 9. As shown in the present example, the housing may be equippped with a safety lever 12.

The brake means 2 is constructed such that it is equipped with a pair of brake arches 14 and 15 fitted into a center bolt 13. Brake shoes 16 and 17 are installed in the above-mentioned arches 14 and 15. A brake returning spring 18, specifically a spectacle type spring in the present example, is provided for returning the brake arches 14 and 15 to their rest position following the application of a braking force.

The Bowden cable 7 has one end of the outer wire 6 mounted to the side of the housing 9 by an outer receiving part 19 and another end thereof mounted by way of an outer receiving part 20 to one of the braking arches 14 and 15, i.e., an arm 14A of the arch 14 in the present example.

The inner wire 5 of the Bowden cable 7 has one end connected by way of a fixture 21 to the brake operating lever 11 and another end connected by way of a fixture 22 to the arch 15, specifically the arm 15A thereof in the present example.

In this embodiment of the present invention and as shown in FIGS. 1 and 2, a lever returning spring 23, a plate spring, is mounted at one end to the front wall 9A of the housing 9 by bolts 24 or the like, while the other end of the spring 23 is held slidably along the internal surface of the operating lever 11 by way of a bend relative to the handlebar in such a way that it can be sprung in a direction against an operating direction 25 of the lever 11, i.e. in a direction of returning the operating lever to the position it occupied prior to applying a grasping force to the lever. FIG. 3, illustrating a second embodiment of the present invention, shows a construction in which one end of the lever returning spring 23, indicated by the plate spring, is mounted by bolts 24 or the like to the housing 9 which is mounted by a band fitting 8 to a standard type handlebar 1. A second end of the aforementioned spring 23 is held rotatably along the internal surface of the operating lever 11 and otherwise the construction is common to such a construction as shown in FIGS. 1 and 2, so the common members are designated correspondingly by common symbols.

Under any of the foregoing embodiments and the below-mentioned embodiments, it may be optional to adopt a center-pull system, a cantilever system, or a hand brake system as a system of the brake means 4. In any case, the construction is required only to be equipped with the brake returning spring which returns the brake, after being actuated, to the original state.

Referring now to FIGS. 4 to 8 illustrating other embodiments of the present invention, their basic construction is common to that of the foregoing embodiments, so the common parts are designated by the common symbols. With reference to these figures, the following description focuses upon their different points.

Figure 4:
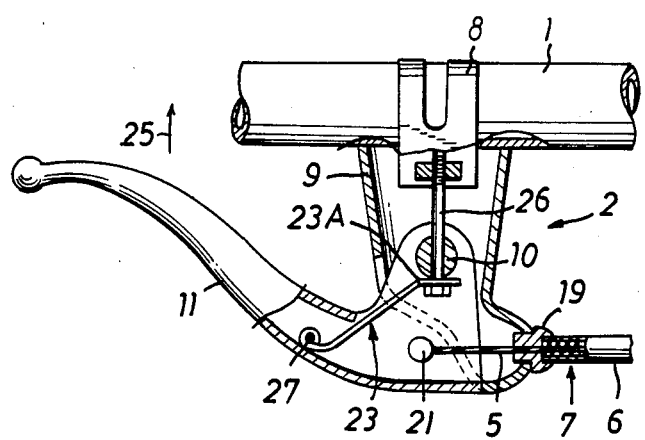
FIGS. 4 through 8 are partially sectioned side views showing additional embodiments of the present invention.

First, FIG. 4 shows an embodiment in which one end of the returning spring 23 is mounted to be incorporated into the side of the housing by fastening it by a head of a fixing bolt 26 which penetrates a fulcrum shaft 10, while another end of the spring 23 is held rotatably by way of a pin 27 along the internal wall relative to the handlebar of the operating lever 11.

Returning spring 23 may be a plate spring, a rod spring or a spring of other known configuration holding a spectacle part on the side of the head of the bolt 26. In any case, returning spring 23 may have end 23A thereof having a forked part which is held detachably in the bolt 26 or a part of locking means for the bolt 26.

Figure 5:
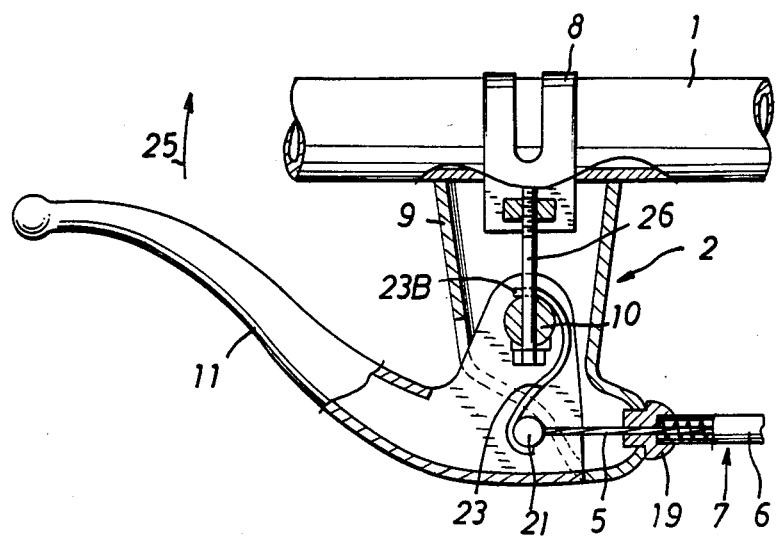

In the embodiment of the present invention shown in FIG. 5 the returning spring 23 is of S-shape and includes a forked part 23B. Forked part 23B is held around the fixing bolt 26 to be mounted to the side of the housing 9, while the bend on another end thereof engages the back of an inner fixture 21. The advantage provided by this embodiment is that the configuration of returning spring 23 prevents disengagement of fixture 21 and the returning spring.

Figure 6:
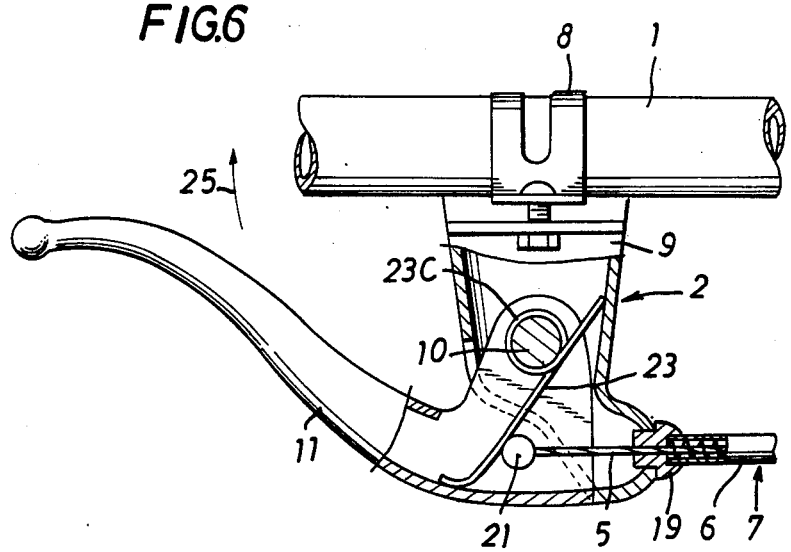

FIG. 6 shows an embodiment in which a winding part 23c of returning spring 23, which may be a plate spring, a rod spring or the like, is fitted around a fulcrum shaft 10, and one end of the spring 23 is held along an upright internal wall of a housing 9, while another end is held slidably along the bottom wall of an operating lever 11. In this embodiment, as shown in the drawing, the advantage provided by the embodiment of FIG. 5 may be provided, if the spring is partially held on the inner fixture 21.

Figure 7:
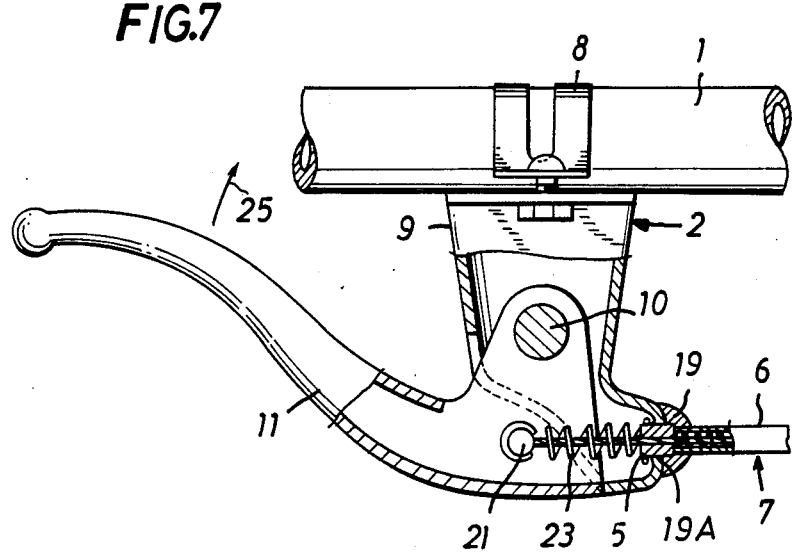

The embodiment of FIG. 7 is concerned with the construction in which one end of the returning spring 23, in this instance a tension type spring, is fitted into a cylindrical part 19A of an outer receiving part 19 for being there attached, while another end thereof, being wound around the inner wire 5, is held around an inner fixture 21. In this embodiment, the outer receiving part 19 and inner fixture 21 are prevented from disengaging.

Figure 8:
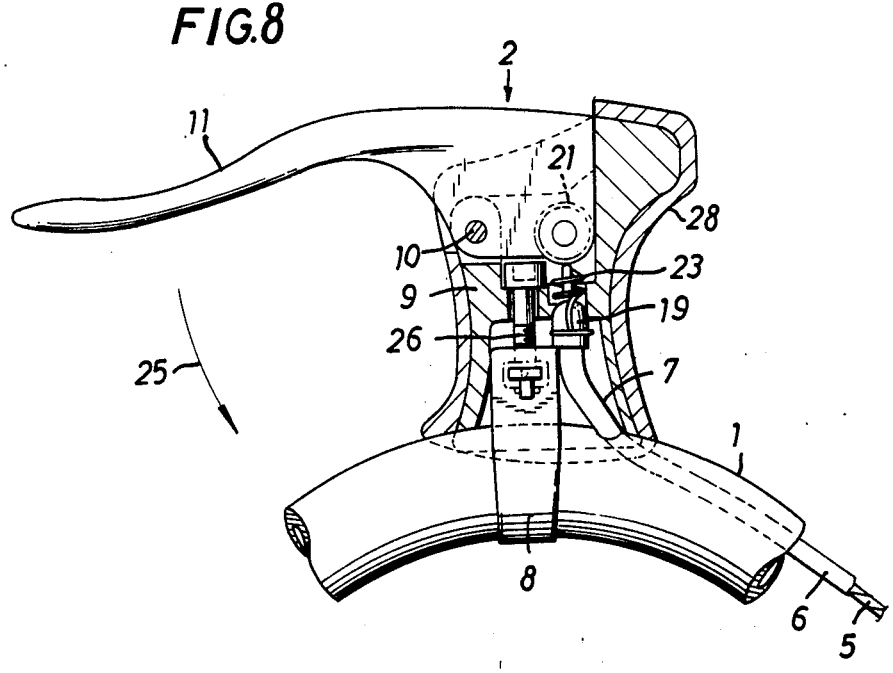

In the embodiment of FIG. 8, the brake means, including the housing 9, is provided with a cover 28. A Bowden cable 7 passes through the handle 1. A tension coil type returning spring 23 is stretched between an inner fixture 21 and an outer receiving part 19, and executes a function similar to that of the embodiment shown in FIG. 7.

I claim:

1. A brake operating device in the construction of which the brake operating device includes a housing mounted to a handlebar and the like and a brake operating lever, having a portion capable of being grasped, which is mounted to the housing; brake means for applying a brake to members to be controlled such as wheels and the like; and a Bowden cable including an inner wire and an outer wire which connect the brake means and the brake operating means to each other so that the brake means may transmit a grasping force applied by the brake operating lever in a direction of applying a brake against an associated brake returning spring, being characterized in that a lever returning spring (23) is provided which has one end mounted to a side of the housing (9) and another end held to a side of the brake operating lever (11) in a direction for returning said lever, and lever returning spring extending from said one end, along a bend formed by an internal surface of the operating lever, to said another end which is disposed at the portion of the lever that is capable of being grasped in a manner applying a force in a direction against the operating direction (25) of the lever (11), so as to act in a direction in which the lever is to be returned.

2. A brake operating device as defined in claim 1, wherein the lever returning spring (23) comprises a plate spring, is mounted to the housing (9) by bolts (24) and the like.

3. A brake operating device as defined in claim 1, wherein said handlebar is of the drop type and wherein said brake operating means includes a safety lever attached to said housing, said returning spring acting to return both said operating lever and said safety lever.

4. A brake operating device as defined in claim 1, wherein the handlebar is of standard type.

5. A brake operating device as defined in claim 1, wherein the handlebar is of the drop type.

6. A brake operating device as defined in claim 2, wherein said handlebar is of the drop type and wherein said brake operating means includes a safety lever attached to said housing, said returning spring acting to return both said operating lever and said safety lever.

7. A brake operating device as defined in claim 2, wherein the handlebar is of standard type.

8. A brake operating device as defined in claim 2, wherein the handlebar is of the drop type.

* * * * *